(No Model.)
W. D. ROWLAND.
SCOOP OR SHOVEL.
No. 420,106.  Patented Jan. 28, 1890.
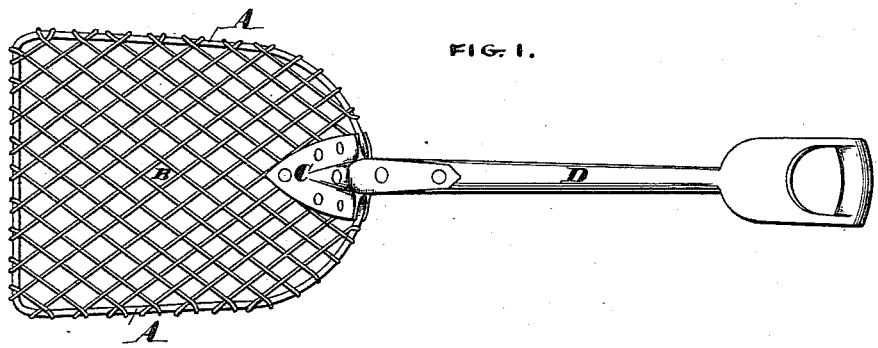
FIG. 2.
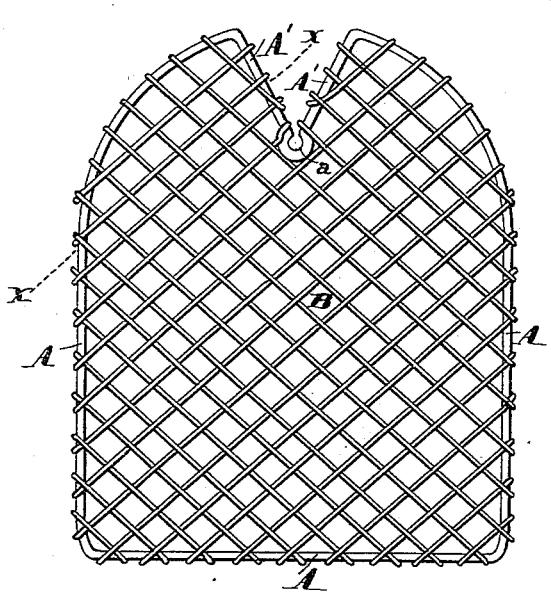
FIG. 3.
FIG. 4.
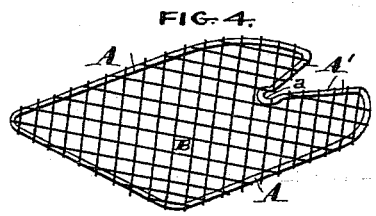
FIG. 5.
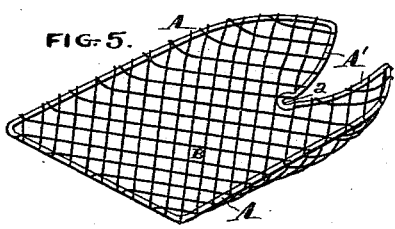
WITNESSES:
Henry Drury
John T. Lewis
INVENTOR:
William Day Rowland
by his attorney
Francis T. Chambers

United States Patent Office.

WILLIAM DAY ROWLAND, OF PHILADELPHIA, PENNSYLVANIA.

SCOOP OR SHOVEL.

SPECIFICATION forming part of Letters Patent No. 420,106, dated January 28, 1890.

Application filed June 4, 1889. Serial No. 313,073. (No model.)

*To all whom it may concern:*

Be it known that I, WILLIAM DAY ROWLAND, of the city and county of Philadelphia, State of Pennsylvania, have invented a new and useful Improved Scoop or Shovel, of which the following is a true and exact description, reference being had to the accompanying drawings, which form a part of this specification.

My invention relates to the construction of a scoop or shovel having the characteristics of a sieve, so that in using them to handle potatoes, turnips, &c., a screening action can take place in the scoop, the dirt or other small foreign matters falling through the interstices of the blade.

My object is to provide a scoop of the described kind which shall be of great strength and durability.

The nature of my invention will be best understood after a description of the drawings in which it is illustrated, and the novel features which I desire to protect by this patent are hereinafter clearly pointed out in the claims.

In the drawings, which form part of this specification, Figure 1 is a face view of my new scoop; Fig. 2, a face view of the frame with woven-wire center, such as I prefer to use in making my new scoop; Fig. 3, a cross-section on the line *x x* of Fig. 2; Fig. 4, a perspective view of what I will call the "blank," as shown in Fig. 2; and Fig. 5, a perspective view of the blank pressed into scoop shape and ready for the attachment of the straps and handle, as shown in Fig. 1.

A represents the wire frame, which is bent to the general form of the top edge of the scoop and preferably has its top edges A' A' bent inward to a point *a*, as shown, to facilitate the pressing of the blank to shape and the attachment of the straps.

B is the woven wire which forms the center of the scoop-blade, and is attached to the frame A A', as shown.

C indicates the straps, which are of any usual construction and fastened to the scoop-blade by rivets.

D is the handle secured in the straps in the usual way.

In making my new scoop I prefer to form a flat blank—such as is shown in Figs. 2 and 4—and then press it to the scoop shape, as shown in Fig. 5, by the ordinary press used in making solid scoop or shovel blades. I then attach the straps, as shown in Fig. 1, and inserting the handle the scoop is ready for use. Obviously the scoop-blades constructed as above described, or woven on a frame or block of the desired form, are salable articles of manufacture apart from the straps and handle, and I desire to be understood as not limiting myself to the completed shovel, except where it is clearly so stated in the claims.

A very important feature of the construction shown is the oblique arrangement of the wires making up the body of the scoop-blade. By weaving the wire on the frame A A', so that each wire will lie in a line oblique to the center line of the scoop, I secure a much stronger and more rigid blade than is possible where the wires lie in line with the said center line or across it at right angles. The construction of the frame with the inwardly-bent upper portion A' not only affords a strong hold to the straps, but enables the scoop-blade to be bent or pressed to the desired form without bending the wires forming the body of the blade upon themselves.

The wires forming the body of the scoop are secured to the frame by bending their ends around it and in pressing the blank to the scoop form. These wires are indented into the frame, so that they cannot slip out of position. When, as is usually the case, the completed scoop is galvanized, the zinc serves as a solder, binding the wires to the frame and together, and when the oblique arrangement of wires preferred and shown in the drawings is used the overlapping ends of the wires at the points where they are secured to the frame serve as locks to prevent slipping.

Having now described my invention, what I claim as new, and desire to secure by Letters Patent, is—

1. As a new article of manufacture, a scoop-blade formed of a frame A A', the upper end A' of which is bent inwardly, and woven wires B, secured to said frame and pressed to the desired scoop shape.

2. As a new article of manufacture, a scoop-blade formed of a frame A A', the upper end A' of which is bent inwardly, and woven wires B, secured to said frame and pressed to the desired scoop shape, in combination with straps C, secured to the inwardly-bent part A' of the frame, and a handle D, attached to said straps.

3. As a new article of manufacture, a scoop-blade formed of a frame A A', the upper end A' of which is bent inwardly, and a body B of woven wires, each lying in an oblique line to the center line of the scoop and secured to the frame, all substantially as and for the purpose specified.

WILLIAM DAY ROWLAND.

Witnesses:
LEWIS R. DICK,
JOSHUA MATLOCK, Jr.